United States Patent Office 3,504,023
Patented Mar. 31, 1970

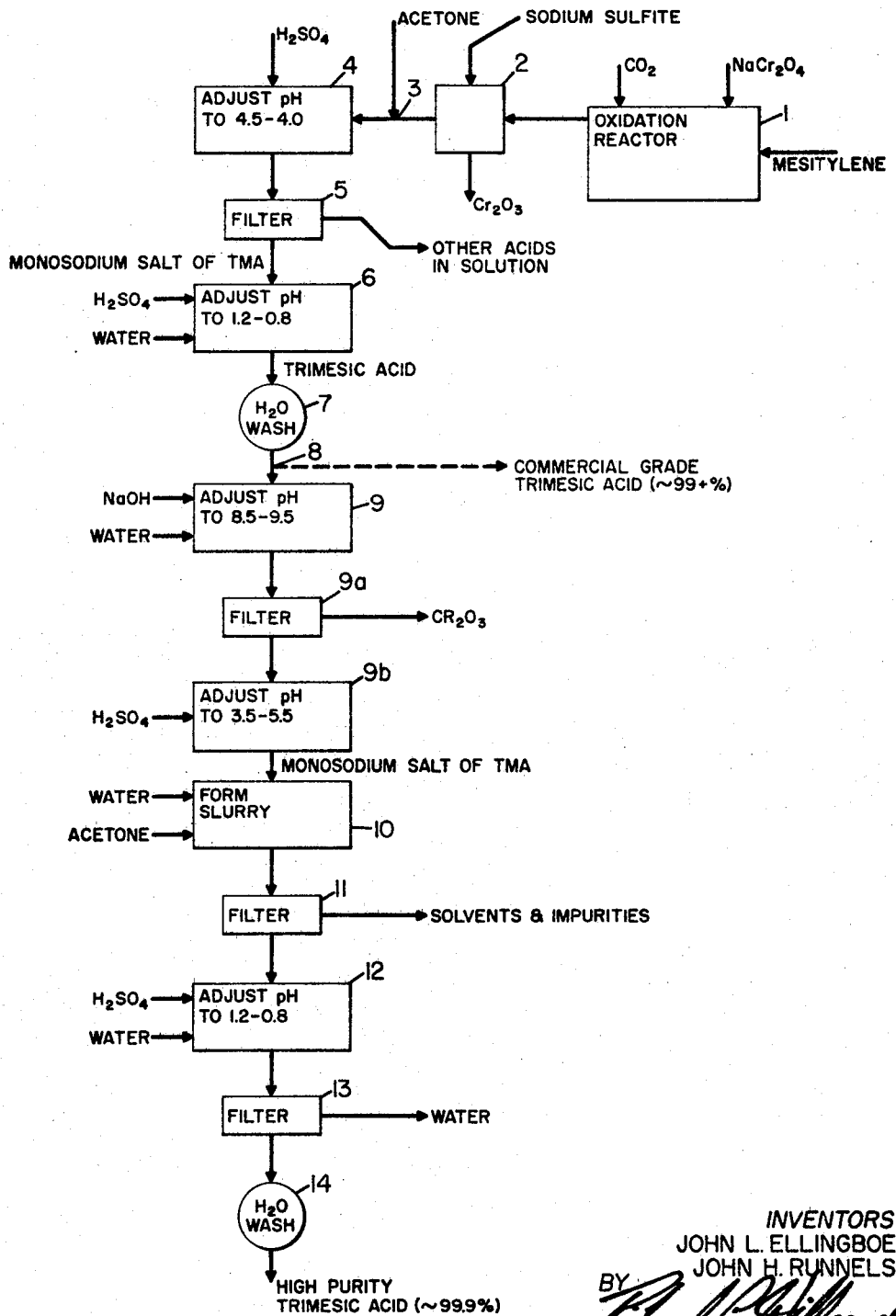

3,504,023
PURIFICATION OF TRIMESIC ACID
John L. Ellingboe, Jr., Findlay, Ohio, and John H. Runnels, Fort Collins, Colo., assignors to Marathon Oil Company, Findlay, Ohio, a corporation of Ohio
Filed Sept. 8, 1965, Ser. No. 485,883
Int. Cl. C07c 51/42
U.S. Cl. 260—525                                    7 Claims

ABSTRACT OF THE DISCLOSURE

The present invention comprises a process for the separation of trimesic acid from mixtures comprising trimesic acid and at least one of the following: uvitic acid, mesitylenic acid, the alkali metal salts of said acids, and mixtures of said acids with alkali metal salts of said acids, said process comprising in combination the steps of adjusting the water content of the mixture to at least 50% by weight of water based on the weight of the mixture, at a temperature of from about 32 to about 160° F., lowering the pH of the mixture to from about 5.5 to 3.0 and removing the mono-alkali metal salt of trimesic acid thus precipitated, and thereafter converting said mono-sodium salt of trimesic acid to free trimesic acid and recovering said acid.

---

The present invention relates to new methods for the purification of organic acids and in particular relates to processes for the separation of trimesic acid from mixtures containing that acid together with one or more of the following aromatic acids: trimesic acid, mesitylenic acid, uvitic acid, and phthalic acids.

Organic acids can be produced by oxidizing mesitylene in the presence of $CO_2$ and a suitable alkali metal dichromate compound to form, in most instances, the alkali metal salts of the organic acids. These metal salts may in turn be converted into the acids by treatment with a strong inorganic acid, e.g., sulfuric acid, or by ion exchange methods such as those disclosed in Ser. No. 420,502, filed Dec. 23, 1964 now U.S. Patent No. 3,439,026, by J. W. Patton and assigned to the assignee of the present invention.

Three acids can be produced from mesitylene: mesitylenic (one acid group with 2 methyl groups), uvitic (two acid groups with one methyl group), and trimesic (three acid groups). Because of the symmetry of mesitylene, no significant quantity of isomeric acids will generally be produced. Phthalic acids will also often be present in the oxidation product mixtures where xylenes and alkyl toluenes having two or more carbon atoms in the alkyl group are present as impurities in the mesitylene feed. Alcohol or aldehyde groups are rarely observed in such product mixtures and are generally present in only such small quantities as to be tolerable in the finished product.

Other impurities commonly present in mesitylene oxidation product mixtures are chromic oxide, unreacted metal dichromate, and sodium or other alkali metal sulfate or other inorganic compound produced by acidification with a strong organic acid.

In most commercial operations, trimesic acid, because of its usefulness as a plasticizer or intermediate is the desired product.

The present invention by utilizing differences discovered among the solubilities of the three acids at various pH levels, provides a method for the separation of the individual acids from the product mixtures. The chromate salts will preferably be first removed by precipitation, for example, by the processes of either Ser. No. 453,668, filed May 6, 1965, now U.S. Patent No. 3,395,177, by J. R. Coleman, Jr., or Ser. No. 444,713, filed Apr. 1, 1965, now U.S. Patent No. 3,413,343, by J. T. Kelly, both of which are assigned to the assignee of the present invention.

The present invention then utilizes the discovery that the mono-alkali metal salt of trimesic acid is surprisingly less soluble in water than the acid. Normally, sodium and other alkali metal salts are much more soluble than the corresponding acids, and the present invention utilizes this reversal of the normal expected solubilities to permit the separation of the monosodium salt from the acid, by lowering the pH of the mixture to from about 5.5 to 3.5 and preferably from about 4.5 to 4.0.

This lowering of the pH precipitates out the major portion of the alkali metal salt of trimesic acid. This alkali metal salt is preferably washed with a volume of water, most preferably equivalent to from 10 to about 30% of the initial volume of the oxidation product mixture being purified.

The resulting monosodium salt is then slurried in water using from about 20 to 80% and preferably from 40 to 60% of the volume of the original product mixture.

This slurry is then acidified to a pH of from 2 to about 0.5 and most preferably from about 1.2 to 0.8.

This low pH converts the sodium salt to trimesic acid and this acid precipitates, leaving further impurities in solution.

The precipitated trimesic acid is removed by filtering (throughout this application, the term filtering is used to include all conventional separatory techniques for removing precipitates from solutions including centrification, decanting, etc.). A wash, preferably from about 10 to 50 and most preferably with from about 20 to 40% of the original volume of the product mixture preferably follows.

It should be understood that throughout this application wherever alkali metal is referred to, the ammonium ion which in many ways acts similarly to alkali metal ions is to be included within that expression. Sodium is the preferred alkali metal.

The trimesic acid produced by the above steps is satisfactory for most commercial applications. However, where desired, the acid may be further purified by treating it with approximately stoichiometric quantities of sodium hydroxide or ammonium hydroxide to convert the acid to its ammonium or alkali metal salt. The resulting alkaline solution is then filtered to remove any remaining chromium as chromic oxide. The acid salts are then acidified to a pH of from 5.5 to about 3.5 and preferably from 4.5 to 4.0, filtered, and slurry-washed with water or most preferably with a water-acetone mixture comprising from 40 to 60% by weight of acetone. This latter acetone-water mixture has been found to further remove minor quantities of other acids. The purification process then continues by converting the mono-alkali metal salt to the acid by treatment with a strong mineral acid or by other methods as discussed above. The alkali metal or ammonium content of the trimesic acid is reduced by further washing with water. Acetone can be substituted for from about 20 to about 60% of the water added in at least one of the steps of the process.

In an especially preferred variation of the present invention, a substantial portion of acetone (preferably equivalent to from about 40 to about 60% by weight of the water present) is added to the original oxidation product mixture. This acetone co-solvent aids in retaining the other acids in solution and permits the recovery of more pure trimesic acid in a single step process. This same variation may, of course, be used in the two step process where exceptionally pure trimesic acid is needed.

FIGURE 1 is a block diagram of a preferred embodiment of the process of the present invention.

In FIGURE 1 mesitylene is conventionally oxidized in the presence of carbon dioxide and sodium chromate in reactor 1. The excess chromate ion in the product mixture is precipitated by converting chromic oxide by treatment with sodium-, ammonium-, or potassium-bisulfite or sulfite (Step 2). After separation of the unreacted chromium ion, from 25 to about 50 volume percent acetone based on the volume of water in the product mixture is added, 3. The use of acetone at this point is based on the discovery that acetone does not dissolve the metal salts of the mesitylenic, uvitic, or trimesic acid but does readily dissolve the corresponding free acids. When the pH of the mixture is lowered to 4.5 to 4.0 by the addition of a mineral acid, e.g., sulfuric acid in Step 4, causing the formation of the sodium salt of trimesic acid; the acetone acts to retain the mesitylenic and uvitic compounds which remain primarily in the free acid state.

The monosodium salt of the trimesic acid is filtered off in Step 5 and the other acids and acid salts contained in the filtrate are either recovered for sale by precipitation at lower pH's or recycled back to the oxidation reactor to form trimesic acid by further oxidation.

The monosodium salt of trimesic acid is then slurried in water (preferably from 20 to about 80 and most preferably from 40 to 60% water based on the weight of the trimesic acid) and sufficient mineral acid, e.g., sulfuric acid, to adjust the pH to from about 1.2 to 0.8 in Step 6. This pH converts the sodium salt to trimesic acid which is preferably washed with water in Step 7 and may then be dried and recovered in Step 8 as a commercial grade of trimesic acid having a purity of, in most cases, better than 99%.

Alternatively, where purity levels of above 99% are required in the finished trimesic acid, the process may be continued in Step 9 by adding water together with a solution amount of a base, e.g., sodium hydroxide, to adjust the pH to from about 8.5 to 9.5 to precipitate $Cr_2O_3$ which is filtered off (Step 9a). Acidifying with acid (Step 9b) to pH of about 3.5 to 4.5 precipitates the monosodium salt or trimesic acid which is then slurried in Step 10 with water and preferably with from about 40 to 60% acetone based on the total weight of the liquid in the slurry. After thorough mixing of the water and acetone with the monosodium salt of trimesic acid, the slurry is filtered in Step 11 to remove the solvents and dissolved impurities which include minor amounts of the other acids and salts of mesitylene. In most cases, it will be preferable to recover the acetone by distillation, but the quantities of impurities will generally not warrant their recovery and separation.

The monosodium salt of trimesic acid is then mixed again with sulfuric acid and water in Step 12 to adjust the pH to from about 1.2 to about 0.8, thus converting the salt to the free trimesic acid. The water, excess acid, and the sodium sulfate or other salt formed during the acidification of the monosodium salt in Step 12 are filtered off in Step 13. A water-wash, 14, is preferable in order to remove any soluble inorganic salt remaining in the acid. The high purity trimesic acid recovered from this process will in most instances have a purity above 99.9%.

In most instances, where liquids are added to the trimesic acid or its mono-alkali metal salt, it is preferable that the quantities of liquids be sufficient to slurry and not dissolve the salt as required in the particular step involved, but not be in excess of about 10 and preferably less than 5 times the weight of the acid or salt. Quantities of solvents in excess of this may cause difficulties by excessive dilution and will, of course, lengthen the filtering process and may possibly dissolve portions of the monosodium salt reducing the efficiency of the separation.

It will be apparent to those skilled in the art that the process as described above is adaptable to a wide variety of variations and modifications and all novel features of the process which fall within the spirit of the invention are to be included within the claims appended thereto.

What is claimed is:

1. A process for the separation of trimesic acid salts from aqueous mixtures comprising trimesic acid salts and at least one of the following: salts of uvitic acid or mesitylenic acid, all of said salts being sodium or ammonium salts, said process comprising in combination the steps of adjusting the water content of the mixture to at least 50% by weight of water based on the weight of the mixture, at a temperature of from about 32 to about 160° F., lowering the pH of the mixture to from about 5.5 to 3.0 and removing the mono-sodium or mono-ammonium salt of trimesic acid thus precipitated, and thereafter converting said mono-sodium or mono-ammonium salt of trimesic acid to free trimesic acid and recovering said acid.

2. A process for the separation of trimesic acid salts from aqueous mixtures comprising trimesic acid salts and at least one of the following: salts of uvitic acid or mesitylenic acid, all of said salts being sodium or ammonium salts, said process comprising in combination the steps of adding acetone to said mixture and adjusting the mixture so that the liquid phase contains from 40 to about 80% by weight of water and from 20 to about 60% by weight of acetone, at a temperature of from about 32 to about 160° F., lowering the pH of the mixture to from about 5.5 to 3.0 and removing the mono-sodium or mono-ammonium salt of trimesic acids thus precipitated, and thereafter converting said mono-sodium or mono-ammonium salt of trimesic acid to free trimesic acid and recovering said acid.

3. The process of claim 1 wherein the monosodium salt of trimesic acid is converted to the acid by mixing with water and acidifying to a pH of from about 2 to about 0.5.

4. The process of claim 1 wherein the mono-sodium or ammonium salt of trimesic acid is precipitated by lowering the pH to from about 4.5 to about 4.0.

5. A process for the separation of high-purity trimesic acid sodium or ammonium salts from mixtures comprising said trimesic acid salts and at least one of the following: the sodium or ammonium salt of uvitic acid or the sodium or ammonium salt of mestiylenic acid, said process comprising in combination the steps of adjusting the content of the mixture to at least 50% by weight of water based on the total weight of the mixture, lowering the pH of the mixture to from about 5.5 to about 2.5, recovering the salt of trimesic acid thus precipitated, mixing said salt with water and adjusting the pH to from about 2 to about 0.5 to form trimesic acid, recovering said trimesic acid and mixing it with water and adjusting the pH to from about 5.5 to about 2.5, recovering the more pure salt of trimesic acid thus precipitated, mixing the more pure salt of trimesic acid with water and adjusting the pH to from about 2 to about 0.5, and recovering the highly purity trimesic acid thus formed.

6. The process of claim 5 wherein acetone is substituted for from about 20 to about 60% of the water added in at least one of the steps of the process.

7. The process of claim 1 wherein the salts of said acids are sodium salts.

References Cited

UNITED STATES PATENTS

| | | | |
|---|---|---|---|
| 3,080,420 | 3/1963 | Ringwald | 260—525 |
| 3,129,244 | 4/1964 | Johnson | 260—525 |
| 1,945,246 | 1/1934 | Nitzel | 260—525 |

LORRAINE A. WEINBERGER, Primary Examiner

R. S. WEISSBERG, Assistant Examiner